Nov. 24, 1942.  H. W. GARBE  2,302,758
ARTICLE ASSEMBLING APPARATUS
Filed Jan. 11, 1940    4 Sheets-Sheet 1

INVENTOR
H. W. GARBE
BY Emery Robinson
ATTORNEY

INVENTOR
H. W. GARBE
BY Emery Robinson
ATTORNEY

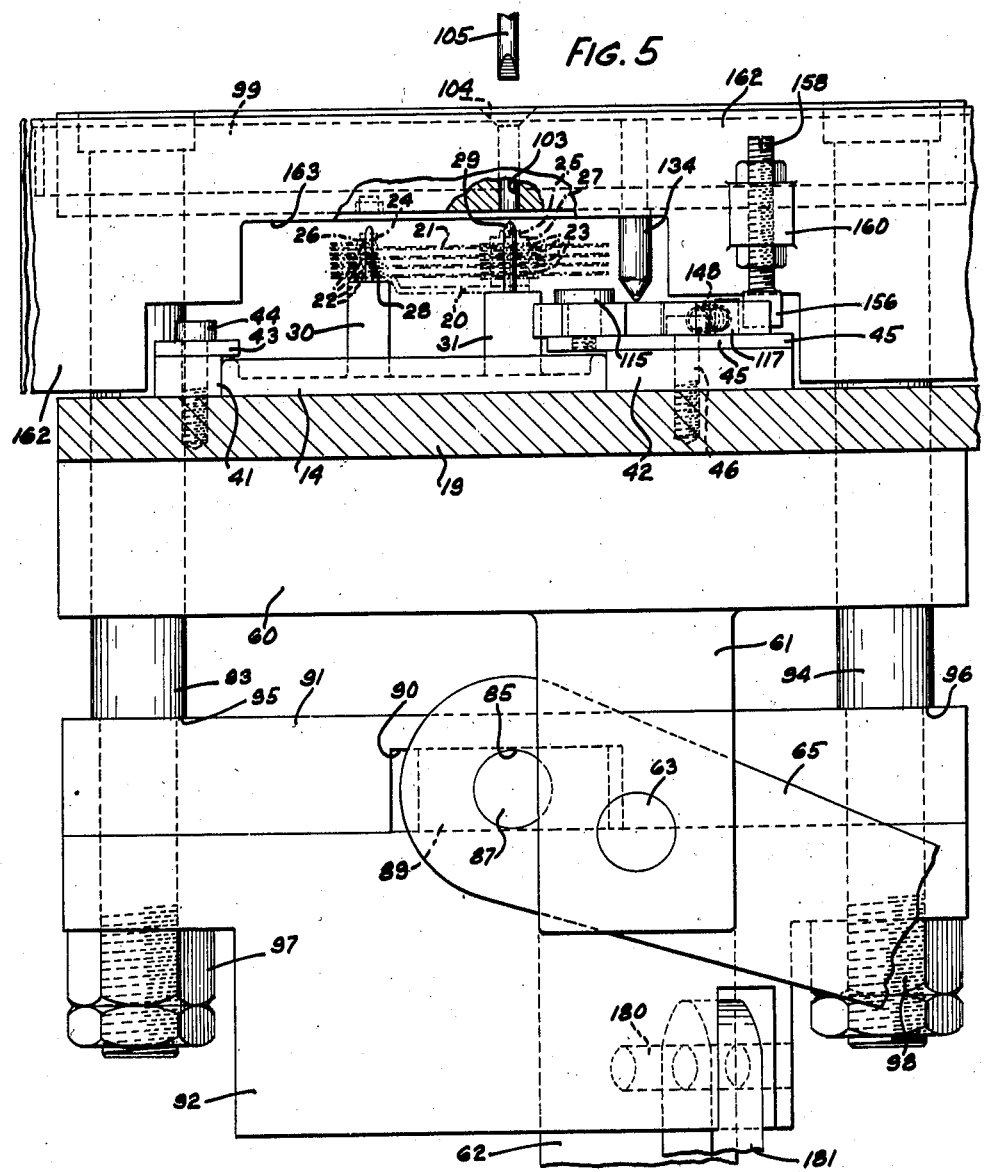

Patented Nov. 24, 1942

2,302,758

UNITED STATES PATENT OFFICE 2,302,758

ARTICLE ASSEMBLING APPARATUS

Howard W. Garbe, Hinsdale, Ill., assignor to Western Electric Company, Incorporated, New York, N. Y., a corporation of New York Application January 11, 1940, Serial No. 313,405

2 Claims. (Cl. 29—84)

This invention relates to article assembling apparatus and more particularly to apparatus for compressing pile-ups of parts during the securing of the parts one to another.

In the manufacture of various types of apparatus, it quite frequently becomes necessary to assemble a plurality of parts which are to be secured together to form a unitary structure, and in some instances it is necessary to attach the parts one to another while under pressure. This type of operation is particularly useful in the assembling of spring pile-ups for relays and other electrical apparatus of a similar nature, for example, cross bar switch vertical units. In apparatus of this type, the various parts of the assemblage must be held in position within very close limits when the parts are assembled and, accordingly, it becomes desirable to assemble the parts loosely on fixtures or jigs and then attach parts one to another by machine screws while the parts are held under a predetermined pressure. Various types of apparatus have been devised for performing this operation, some of them utilizing a leverage arrangement actuated by the pressure of an operator's foot and various other expedients have been adopted from time to time.

It is an object of the present invention to provide an improved assembling apparatus which operates rapidly and which is safe to operate.

In accordance with one embodiment of the invention, as applied to apparatus for securing the parts of cross bar switch vertical units one to another which will accommodate various heights of pile-ups without readjustment, there is provided a pneumatically actuated pressing head adapted to be driven by a reversible piston, which, upon movement in one direction, will clamp an assembly of conducting elements and insulators held on a fixture in a predetermined position so that screws may be threaded through the assembled parts to hold them in a predetermined relation one to another. Cooperating with the pressing head is an ejecting mechanism, which will strip a vertical unit, which has been screwed together, from the fixture on which it is mounted each time the pressing head compresses an assembly of parts. The compressing and ejecting mechanism are so positioned that they will act upon assemblies on abutting fixtures or jigs and means is provided for preventing operation of the compressing and ejecting mechanism unless two fixtures carrying the proper assembly of parts are in position in the compressing and ejecting sections of the machine.

A better understanding of the invention will be had by reference to the following detailed description when considered in connection with the accompanying drawings, wherein Fig. 1 is a front elevational view of a compressing and ejecting apparatus which embodies the present invention;

Fig. 5 is a fragmentary sectional view taken on the line 5—5 of Fig. 4 in the direction of the arrows.

Figure 1:
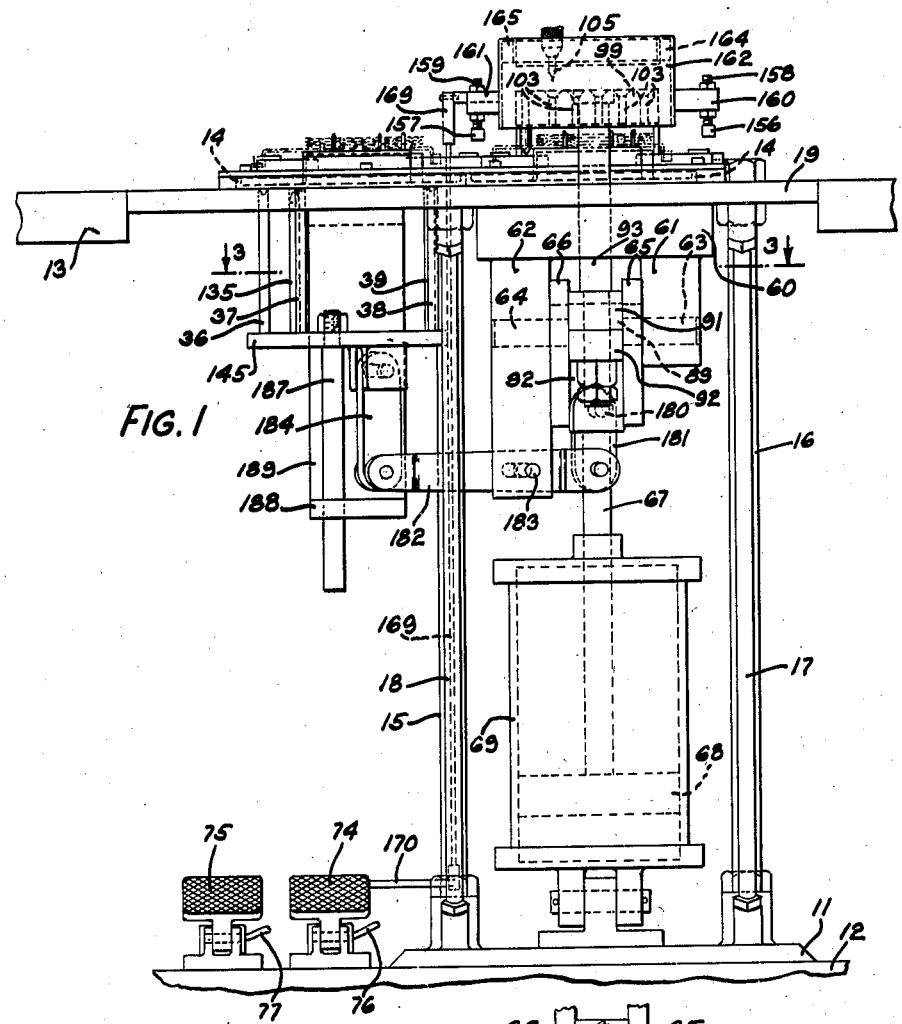
Figure 2:
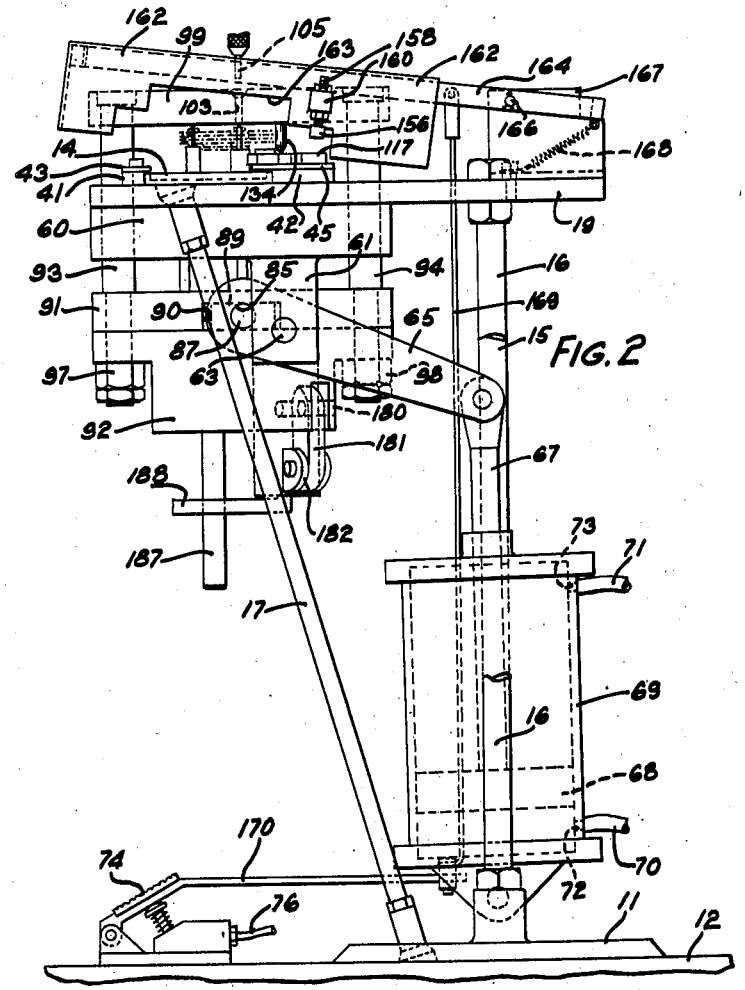
Fig. 2 is a side elevational view of the apparatus shown in Fig. 1.

Referring to the drawings, wherein like reference characters designate the same parts throughout the several views, particular reference being had to Figs. 1 and 2, the embodiment of the apparatus herein disclosed comprises a base 11, rectangular in form, which may be positioned on the floor 12 of a room in which the apparatus is to be used. The upper portion of the apparatus extends through a suitable bench 13, which may form a part of a conveyor system onto which fixtures 14—14 (Figs. 4 and 5) may be advanced during the straight line assembly of the apparatus being assembled by means of the herein described embodiment of the present invention. Extending upwardly from the base 11, as shown in Figs. 1 and 2, are four tie rods 15, 16, 17 and 18, which are suitably secured to the base 11 and have mounted at their upper end a bed plate 19.

The parts to be secured together in the apparatus disclosed herein are the parts going into the assembly of what is known as a telephone central office cross bar switch vertical unit. It will be understood that this unit does not form a part of the present invention, but that the embodiment of the invention being described herein is particularly adapted for assembling such apparatus. A cross bar switch vertical unit is shown in dot and dash lines in Figs. 4 and 5 and comprises a mounting plate 20 on which superposed insulators and contact springs are to be mounted. The contact springs have been designated 21 and the insulators indicated at 22—22 and 23—23. The mounting plate 20 is threaded to receive fastening screws 24—24 and 25—25, which are passed through clamp plates 26 and 27, respectively, and clamp the plates 26 and 27 tightly in engagement with the pile-up of springs and insulators.

In assembling the various parts of the cross bar switch vertical unit in their proper relation, the parts are assembled on the fixture 14, which is provided with upwardly extending pins 28—28 and 29—29, which extend from supporting blocks 30 and 31 (Fig. 5) formed integrally with and extending upwardly from the base of the fixture 14. Each of the fixtures 14 have four apertures 32, 33, 34 and 35 formed therein through which stripping pins 36, 37, 38 and 39 may be passed, in a manner to be described hereinafter, to strip the assembled cross bar unit off of the pins 28—28 and 29—29 after the various parts of the cross bar unit have been fixed together.

Mounted on the bed plate 19 are a pair of guide blocks 41 and 42, between which the fixtures 14 are guided in their movement through the apparatus. The guide block 41 has a hold down plate 43 mounted upon it and the block 41 and plate 43 are fixed to the bed plate 14 by means of a series of screws 44. A plate 45, similar to the plate 43 but somewhat wider than it, is mounted on top of the guide block 42, being held, together with the guide block, on the bed plate 19 by screws 46. These guide blocks and hold down plates serve to guide and hold the fixtures 14 while they are in position in the apparatus.

Suitably secured to the underside of the bed plate 19 is a bearing block 60, from which extend a pair of bearings 61 and 62, having mounted in them a pair of studs 63 and 64 for pivotally supporting a pair of levers 65 and 66, respectively. The levers 65 and 66 are secured to opposite sides of a piston rod 67, which is adapted to be actuated by a piston 68, slidable in a cylinder 69. A pair of hoses 70 and 71 communicate with ports 72 and 73, respectively, for supplying air under pressure to the cylinder 69 to actuate the piston 68. The supply of air to the hoses 70 and 71 may be controlled by a pair of treadles 74 and 75 having pipes 76 and 77, respectively, for connecting them to suitable valves (not shown), which, in turn, control the flow of air through the hoses 70 and 71. The treadle 74 is connected to the valves (not shown) in such a manner that depression of the treadle 74 will cause air under pressure to be admitted to the lower end of the cylinder 69 through the hose 70 and will permit the air in the upper end of the cylinder to escape through the hose 71. Conversely, depression of the treadle 75 will cause air under pressure to be admitted to the upper end of the cylinder through hose 71 and will permit the air in the lower end of the cylinder to escape through the hose 70.

Figure 3:
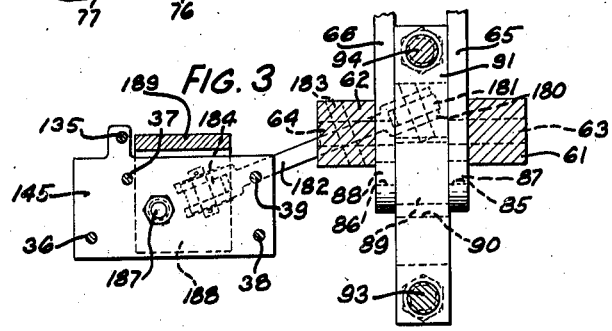
Fig. 3 is a fragmentary sectional view taken on the line 3—3 of Fig. 1 in the direction of the arrows.

Formed in the left end (Figs. 2, 3 and 5) of the levers 65 and 66 are apertures 85 and 86, which are adapted to receive trunnions 87 and 88, respectively, extending outwardly from a block 89. The block 89 is slidable horizontally in an aperture 90 formed by cooperating surfaces of a plate 91 and an actuator block 92, which are held together by a reduced portion of a pair of actuator rods 93 and 94, which rods are provided with shoulders 95 and 96, respectively, against which the plate 91 is forced by the action of nuts 97 and 98 threaded onto the lower ends of the rods 93 and 94, respectively. Fixed to the upper ends of the actuator rods 93 and 94 is a pressing head 99, which serves to compress the assembled parts of the cross bar switch vertical unit when it is moved downwardly by clamping the parts between the fixture 14 on the bed plate 19 and the pressing head 99. The lower surface of the pressing head 99 has a series of circular depressions 100 therein into which the heads of the screws 24 extend and a pair of depressions 101 and a pair of depressions 102 into which the pins 28 and 29 extend, respectively, when the pressing head 99 is moved downwardly to compress a pile-up of cross bar switch unit parts positioned under it. The heads of the screws 25 extend into apertures 103, which are counter-sunk, as shown at 104, to receive the bit 105 of a screw driver and direct it into engagement with the slotted heads of the screws 25 while the assembly of parts is held under compression.

Pivotally mounted on pivot pins 115 and 116 (Fig. 4) are a pair of positioning members 117 and 118, which cooperate with positioning members 119 and 120 to properly center two assemblies of parts mounted in fixtures 14 in position in the apparatus. The positioning members 119 and 120 are mounted on pivot pins or studs 121 and 122, respectively, and are normally urged to rotate in a clockwise direction about the pivot pins 121 and 122 by coil springs 123 and 124 fixed to them and to the plate 45. A pair of pins 125 and 126 enter into slots 127 and 128, respectively, in the positioning members 119 and 120 to limit the movement of the positioning members. When the positioning members are in the position shown in Fig. 4, the lower right hand corners of them will engage shoulders 129 of the supporting block 30 on the two fixtures 14.

Figure 4:
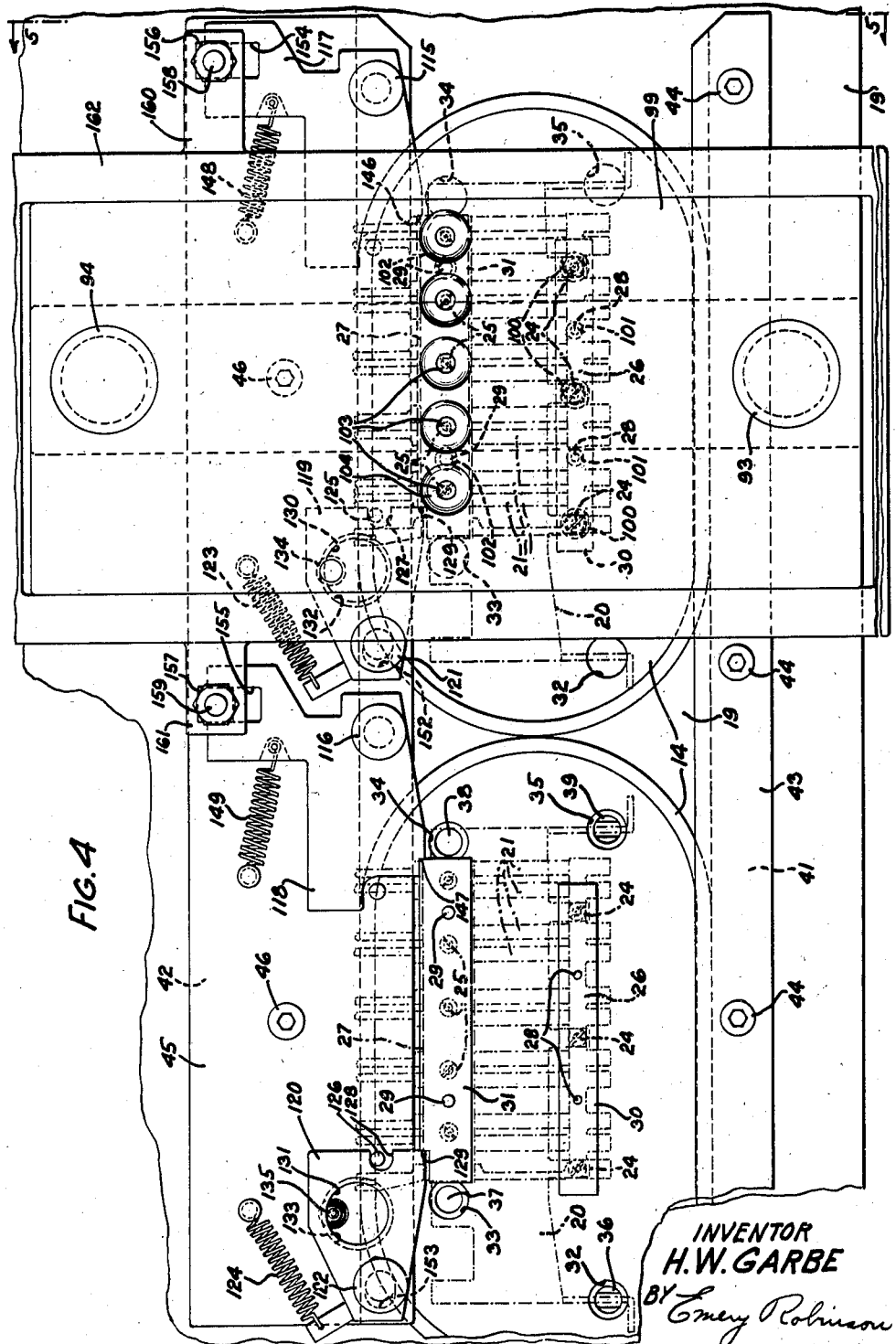
Fig. 4 is a fragmentary plan view of the upper portion of the mechanism shown on an enlarged scale and parts being broken away to conserve space.

Both of the positioning members 119 and 120 have circular apertures formed therein, designated 130 and 131, respectively, which are counter-sunk on their upper and lower sides, respectively, as shown at 132 and 133, respectively, for engagement by tapered pins 134 and 135, respectively. The tapered pin 134 is mounted on the undersurface of the pressing head 99 and when the pressing head moves downwardly, the tapered point of the pin 134, as shown most clearly in Fig. 5, will engage the counter-sunk or sloping edge of the aperture 130 and cam the positioning member 119 upwardly, as viewed in Fig. 4, out of the path of the fixture 14. In a similar manner, the pin 135, which is mounted upon a vertically reciprocable cross head 145 (Figs. 1 and 3) which also carries the ejecting pins 36, 37, 38 and 39, as will be described hereinafter, may be moved simultaneously with the pressing head 99 to cam the positioning member 120 in a counter-clockwise direction out of the path of the shoulder 129 on the left hand fixture 14 (Fig. 4). The lower left hand edges (Fig. 4) of the positioning members 117 and 118 have notches 146 and 147 formed therein for engaging the upper right hand corner (Fig. 4) of the supporting block 30 on the fixtures 14. These positioning members 117 and 118 are normally urged to rotate in a counter-clockwise direction by coil springs 148 and 149 fixed to the positioning members and to the plate 45. The lower surface (Fig. 4) of the positioning members 117 and 118 serves as a camming surface for engagement by the supporting blocks 30 in their passage to the position in which they are shown in Fig. 4 and when a fixture 14, carrying an assembly of parts, is moved from left to right (Fig. 4) into the position shown, the supporting block 30 will rock the positioning members 117 and 118 in a clockwise direction until the shoulders 129 on the supporting blocks move the positioning members 119 and 120 to the position shown in Fig. 4, at which time the notches 146 and 147 in the positioning members 117 and 118 will permit the springs 148 and 149 to move the positioning members 117 and 118 in a counter-clockwise direction to the position shown. When the fixtures 14 arrive at the position shown in Fig. 4, the parts assembled on the right hand fixture 14 may be compressed and the parts assembled on the left hand fixture 14 may be moved upwardly off of the pins 28 and 29. As the pressing head 99 moves downwardly, carrying the pin 134 with it, and as the pin 135 moves upwardly, the two positioning members 119 and 120 will be cammed in a counter-clockwise direction, as pointed out hereinbefore, and as soon as they are free of the shoulder 129 on the supporting block 30, the springs 123 and 124 will snap the positioning members 119 and 120 to the right (Fig. 4) due to the fact that the shanks of the pins 121 and 122 do not pass through a circular aperture in the members 119 and 120, respectively, but extend through slots 152 and 153, respectively. However, when the fixture 14, shown in the right hand position (Fig. 4), is moved to the left hand position, the supporting block 30 will engage the positioning member 120 and move it to the position shown, whereas a new fixture (not shown), but exactly the same as the fixtures 14, will, in moving to the position of the right hand fixture 14 (Fig. 4), move the positioning member 119 to the position shown.

The positioning members 117 and 118 have slots 154 and 155 formed in them, which will, when a fixture 14 with a proper assembly of parts thereon is in each of the positions shown in Fig. 4, register with the heads 156 and 157 of screws 158 and 159, respectively. The screws 158 and 159 are fixed in lugs 160 and 161 extending outwardly from the edges of a guard member 162. The guard member 162 is substantially rectangular in configuration and may be moved downwardly from the position shown in Fig. 2 to enclose substantially all of the mechanism of the pressing head, thereby to prevent an operator from being injured by the action of the pressing parts. The guard member 162 is cut out at 163 to avoid striking various parts of the apparatus and is mounted upon a pair of levers 164 and 165, which extend toward the rear or left hand end of the apparatus, as shown in Fig. 2, and are pivoted as shown at 166 on supports 167. A contractile spring 168 is fixed to the right hand end (Fig. 2) of the levers 164 and 165 and normally urges the guard member 162 up away from the pressing head 99 and jig 14. To the right of the pivot point 166 a link 169 is attached to the guard member 162. The link 169 extends downwardly to a lever 170, which is fixed to the treadle 74, and unless the heads 156 and 157 find that the positioning members 117 and 118 are in the position shown in Fig. 4, the heads 156 and 157 of the screws 158 and 159 will strike the positioning members and will not enter the slots 154 and 155, respectively, thereby preventing operation of the treadle 74. However, if the fixtures 14 are in the positions shown in Fig. 4, the positioning members 117 and 118 will be in the position shown and the heads 156 and 157 of the screws 158 and 159 may enter the slots 154 and 155, thereby to permit the guard member 162 to be moved downwardly against the action of the spring 168 and permit the consequent depression of the treadle 74, which, as described hereinbefore, will control the admission of air under pressure to the lower end of the cylinder 69 to move the pressing head 99 downwardly.

Pivotally connected to the actuator block 92, as shown at 180, is a link 181, which is, in turn, pivotally connected to a lever 182. The lever 182 is mounted for oscillation about a pin 183 (Figs. 1 and 3) fixed in the lower end of the bearing 62 and has its left end (Figs. 1 and 3) pivotally connected to a link 184, which is, in turn, pivotally mounted on the cross head 145 to impart movement to the cross head 145 every time the piston 68 is actuated. A guide pin 187 is fixed to the cross head 145 and is slidable in a horizontally extending plate 188 mounted on the lower end of a vertically extending plate 189, which is, in turn, secured to the underside of the bed plate 19.

*Operation*

A better understanding of the apparatus may be had from the following brief description of the operation thereof.

A number of fixtures 14 are provided on which there may be loosely assembled a pile-up of cross bar switch vertical unit parts comprising the mounting plate 20, contact springs 21, insulators 22 and 23, screws 24 and 25, and clamping plates 26 and 27. These parts are assembled by an operator and may be transported to the compressing apparatus forming the subject matter of this invention, in any suitable manner, where the fixture with the assembled parts on it may be slid along the bed plate 19 and the fixtures, in sliding along the bed plate 19, will have their edges under the plates 43 and 45, the fixtures 14 being slid into the apparatus from right to left, as shown in Figs. 1 and 4. As the fixture 14 is slid between the guide blocks 41 and 42, the supporting block 31 will cam the positioning member 117 out of its path by engaging the lower surface thereof (Fig. 4). As soon as the shoulder 129 of the supporting block 31 moves the positioning member 119 to the position shown, the notch 146 in the positioning member 117 will be in alignment with the right hand end (Fig. 4) of the supporting block 31 and therefore the positioning member 117 will be rocked about its pivot 115 by the spring 148 to properly position the fixture 14 in the pressing head. As the shoulder 129 of the supporting block 31 engaged the right hand end (Fig. 4) of the positioning member 119, it moved the positioning member to the left (Fig. 4) to the position as shown, the positioning member sliding along its pivot pin 121. At the beginning of the operation of the device, it will be necessary to manipulate the positioning member 118 by hand in order to bring the slot 155 thereof in registry with the head 157 of the screw 159, since at this time there will be no fixture 14 in the left hand position, as shown in Fig. 4. When the fixture 14 has been moved into the right hand position, as seen in Fig. 4, and the positioning member 118 moved manually, as just described, the treadle 74 may be depressed to move the guard member 162 downwardly and permit air under pressure to flow through the pipes 76 to control the valves (not shown), thereby to admit air under pressure through the hose 70 to the lower end of the cylinder 69. The piston 68 will thus be moved upwardly by air under pressure in the lower end of the cylinder, and in moving upwardly, will rock the levers 65 and 66 about on the studs 63 and 64, thereby to move the actuator block 92 downwardly and apply a predetermined pressure to the parts on the fixture 14 in the right hand position (Fig. 4) through the downward movement of the pressing head 99. The movement downwardly of the actuator block 92 will, through the lever 182 and links 181 and 184, cause the cross head 145 to move upwardly. The upward movement of the cross head 145 in the first operation of the machine does not perform any useful operation since no fixture 14 is in the left hand position (Fig. 4). While the pressing head 99 is held downwardly through the action of the piston 68, the screws 25 may be set by means of the screw driver having the bit 105 and after the screws have been properly set, the treadle 75 may be actuated to permit the air under pressure in the lower end of the cylinder 69 to escape and to supply air under pressure to the upper end of the cylinder through the hose 71. As the pressing head 99 moved downwardly on its initial operation, it carried the tapered pin 134 with it and cammed the positioning member 119 in a counter-clockwise direction about the pivot pin 121 to move the lower edge of the positioning member 119 out of the path of the shoulder 129 on the block 31. As soon as the pin 134 moves the positioning member 119 out of engagement with the shoulder 129, the positioning member 119 will be moved bodily with respect to the pivot pin 121 by the spring 123 to permit the fixture 14 with the tightened assembly of parts thereon to be pushed past the positioning member 119 by a fixture 14 being pushed in under the hold-down plates 43 and 45 from right to left and abutting the fixture 14, now shown in the right hand position (Fig. 4). The fixture 14 in the right hand position (Fig. 4) will thus be moved over into the left hand position and a new fixture 14 with a loosely assembled pile-up of parts thereon will be moved under the pressing head. As soon as the operator has pushed the new fixture 14 in under the pressing head 99, the fixture 14, carrying the parts which have been tightened together, will have cammed the positioning member 119 in a clockwise direction and have moved the positioning member 120 to its left hand position, as shown in Fig. 4, at which time the spring 149 will snap the positioning member 119 to the position shown and since there will then be fixtures positioned in both the right and left hand positions, the next operation of the treadle 74 will cause the parts in the right hand position to be clamped under pressure while the screws 25 are set therein and as the pressing head 99 moves downwardly, the cross head 145 will move upwardly to carry the stripping pins 36, 37, 38 and 39 upwardly into engagement with the mounting plate 29 and will strip the assembled cross bar unit off of the locating pins 28 and 29. The fixture 14 in the left hand position will be held down by the plates 43 and 45 and the stripping pins 36, 37, 38 and 39 will pass upwardly through the apertures 32, 33, 34 and 35, respectively, in the fixture 14. As the cross head 145 moves upwardly, the tapered pin 135 will engage the edge of the aperture 131 and rock the positioning member 120 in a counter-clockwise direction at the same time that the pin 134 rocks the positioning member 119. When the positioning members 119 and 120 are rocked in a counterclockwise direction, the springs 123 and 124 will move the positioning members bodily along the pins 121 and 122 to carry them out of the path of the shoulder 129 on the blocks 31 and a new loosely assembled group of parts mounted on the fixture 14, may be slid into position under the pressing head, thereby to force the fixture 14 in the ejecting position out of the apparatus after the screws 25 have been set.

Although a specific embodiment of the invention has been described hereinbefore as illustrative of the present invention, it will be understood that many modifications of this apparatus may be made without departing from the scope of the appended claims.

What is claimed is:

1. In an apparatus for use in assembling articles, a compressing station, an ejecting station including an ejecting mechanism, a guideway common to said stations for directing fixtures with articles thereon from the compressing station to the ejecting station, a pivotally mounted cylinder, a piston for cooperation with said cylinder, a piston rod connected to the piston, a leverage mechanism connected to the piston rod, a pressing head at the compressing station operated by said leverage mechanism, a second leverage mechanism interconnected with said piston for actuating the ejecting mechanism, said piston being operable to effect actuation of the pressing mechanism and the ejecting mechanism simultaneously to compress the parts of an article in the compressing station and eject the parts of an article at the ejecting station, a guard movable to enclose substantially all of the edges of the article at the pressing station, movably mounted positioning members at the compressing station and the ejecting station for positioning the fixtures at their respective stations, said positioning members adapted to lie in one position when the fixtures are properly placed at their respective stations, but to lie in a different position when said parts are improperly placed, contact means mounted on the guard for registration with the positioning members at both stations and adapted to contact said positioning members when parts are improperly placed in either the compressing or the ejecting stations to prevent closing movement of said guards, said contact means being adapted to clear the positioning members when articles are properly placed at both stations, and means interconnected with the guard for controlling the operation of the piston including mechanism requiring the guards to be moved to the closed position before the piston may be actuated.

2. In an apparatus for use in assembling articles, a compressing station, an ejecting station including an ejecting mechanism, a guideway common to said stations for directing fixtures with articles thereon from the compressing station to the ejecting station, power means, a mechanism connected to the power means, a pressing head at the compressing station operated by said mechanism, a second mechanism interconnected with said power means for actuating the ejecting mechanism, said power means being operable to effect actuation of the two mechanisms simultaneously to compress the parts of an article in the compressing station and to eject the parts of an article at the ejecting station, a guard movable to enclose substantially all of the edges of the article at the pressing station, movably mounted positioning members at the compressing station and the ejecting station for positioning the fixtures at their respective stations, said positioning members adapted to lie in one position when the fixtures are properly placed at their respective stations, but to lie in a different position when said parts are improperly placed, contact means mounted on the guard for resignation with the positioning members at both stations and adapted to contact said positioning members when parts are improperly placed in either the compressing or the ejecting station to prevent closing movement of said guard, said contact means being adapted to clear the positioning members when articles are properly placed at both stations, and means interconnected with the guard for controlling the operation of the power means including mechanism requiring the guard to be moved to closed position before the power means may be actuated.

HOWARD W. GARBE.